United States Patent
Barton et al.

(10) Patent No.: US 7,947,093 B2
(45) Date of Patent: *May 24, 2011

(54) QUATERNARY AMMONIUM SALT DETERGENTS FOR USE IN FUELS

(75) Inventors: William Barton, Belper (GB); Mark C. Davies, Belper (GB); David J. Moreton, Belper (GB); Paul R. Stevenson, Belper (GB); Dean Thetford, Rochdale (GB)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/822,266

(22) Filed: Jun. 24, 2010

(65) Prior Publication Data

US 2010/0257779 A1    Oct. 14, 2010

Related U.S. Application Data

(62) Division of application No. 11/917,168, filed as application No. PCT/US2006/022925 on Jun. 13, 2006.

(60) Provisional application No. 60/691,115, filed on Jun. 16, 2005.

(51) Int. Cl.
  *C10L 1/22* (2006.01)
  *C07D 207/50* (2006.01)

(52) U.S. Cl. ............. 44/422; 44/321; 44/412; 548/545

(58) Field of Classification Search .............. 44/321, 44/412, 422, 435; 548/545
See application file for complete search history.

(56) References Cited

U.S. PATENT DOCUMENTS

| | | | |
|---|---|---|---|
| 3,401,119 A * | 9/1968 | Froehlich | 510/481 |
| 3,468,816 A * | 9/1969 | Ballweber et al. | 564/292 |
| 3,749,695 A | 7/1973 | de Vries | |
| 4,141,959 A * | 2/1979 | Kato et al. | 423/239.1 |
| 4,171,959 A | 10/1979 | Vartanian | |
| 4,338,206 A | 7/1982 | Hammond et al. | |
| 4,482,356 A | 11/1984 | Hanlon | |
| 4,904,278 A * | 2/1990 | Wollenberg et al. | 44/348 |
| 5,059,335 A * | 10/1991 | Rizvi et al. | 508/293 |
| 5,254,138 A * | 10/1993 | Kurek | 44/347 |
| 5,279,626 A | 1/1994 | Cunningham et al. | |
| 5,752,989 A | 5/1998 | Henly et al. | |
| 5,833,722 A | 11/1998 | Davies et al. | |
| 6,403,725 B1 | 6/2002 | Huang et al. | |
| 7,435,845 B2 | 10/2008 | Dahlmann et al. | |
| 2007/0142238 A1* | 6/2007 | Katafuchi | 508/192 |

FOREIGN PATENT DOCUMENTS

| | | |
|---|---|---|
| EP | 1466903 | 10/2004 |
| GB | 960493 | 10/1964 |
| WO | 98/42808 | 10/1998 |
| WO | 2004065430 | 8/2004 |

OTHER PUBLICATIONS

Search Report for corresponding PCT Application No. PCT/2006/022925 published Mar. 1, 2007.

* cited by examiner

*Primary Examiner* — Glenn A Caldarola
*Assistant Examiner* — Pamela Weiss
(74) *Attorney, Agent, or Firm* — Christopher D. Hilker; David M. Shold

(57) ABSTRACT

A quaternary ammonium salt detergent made from the reaction product of the reaction of: (a) a hydrocarbyl substituted acylating agent and a compound having an oxygen or nitrogen atom capable of condensing with said acylating agent and further having a tertiary amino group; and (b) a quaternizing agent suitable for converting the tertiary amino group to a quaternary nitrogen and the use of such quaternary ammonium salt detergents in a fuel composition to reduce intake valve deposits.

5 Claims, No Drawings

US 7,947,093 B2

QUATERNARY AMMONIUM SALT DETERGENTS FOR USE IN FUELS

CROSS-REFERENCE TO RELATED APPLICATIONS

This is a divisional of copending application U.S. Ser. No. 11/917,168 filed on Jun. 9, 2008 which itself claim priority to US provisional application number 60/691,115 filed on Jun. 16, 2005.

BACKGROUND OF THE INVENTION

The composition of the present invention related to a quaternary ammonium salt detergent and the use of such quaternary ammonium salt detergents in a fuel composition to reduce intake valve deposits and remove or clean up existing deposits on the intake valves.

It is well known that liquid fuel contains components that can degrade during engine operation and form deposits. These deposits can lead to incomplete combustion of the fuel resulting in higher emission and poorer fuel economy. Fuel additives, such as detergents, are well known additives in liquid fuels to help with control or minimize deposit formation. As the dynamics and mechanics of an engine continual advance, the requirements of the fuel must evolve to keep up with these engine advancements. For example, today's engines have injector system that have smaller tolerances and operate at higher pressure to enhance fuel spray to the compression or combustion chamber. Deposit prevention and deposit reduction in these new engines has become critical to optimal operation of today's engines. Advancements in fuel additive technology, such as detergents, have enabled the fuel to keep up with these engine advancements. Therefore there is a need for detergent capable of providing acceptable performance in a liquid fuel to promote optimal operation of today's engines.

U.S. Pat. No. 5,000,792 discloses polyesteramine detergent obtainable by reacting 2 parts of polyhydroxycarboxylic acids with 1 part of dialkylenetriamine.

U.S. Pat. No. 4,171,959 discloses a motor fuel composition containing quaternary ammonium salts of a succinimide. The quaternary ammonium salt has a counterion of a halide, a sulphonate or a carboxylate.

U.S. Pat. Nos. 4,338,206 and 4,326,973 discloses fuel compositions containing a quaternary ammonium salt of a succinimide, wherein the ammonium ion is heterocyclic aromatic (pyridinium ion).

U.S. Pat. No. 4,108,858 discloses a fuel or lubricating oil composition containing a C2 to C4 polyolefin with a Mw of 800 to 1400 salted with a pyridinium salt.

U.S. Pat. No. 5,254,138 discloses a fuel composition containing a reaction product of a polyalkyl succinic anhydride with a polyamino hydroxyalkyl quaternary ammonium salt.

U.S. Pat. No. 4,056,531 discloses a lubricating oil or fuel containing a quaternary ammonium salt of a hydrocarbon with a Mw of 350 to 3000 bonded to triethylenediamine. The quaternary ammonium salt counterion is selected from halides, phosphates, alkylphosphates, dialkylphosphates, borates, alkylborates, nitrites, nitrates, carbonates, bicarbonates, alkanoates, and O,O-dialkyldihtiophosphates.

U.S. Pat. No. 4,248,719 discloses a fuel or lubricating oil containing a quaternary ammonium salt of a succinimide with a monocarboxylic acid ester. U.S. Pat. No. 4,248,719 does not teach, suggest or otherwise disclose low sulphur fuels, presence of fluidisers etc. Example 1 teaches polyisobutylene succinimide with DMAPA as the amine. The succinimide is then reacted with a salicylate.

U.S. Pat. Nos. 4,253,980 and 4,306,070 disclose a fuel composition containing a quaternary ammonium salt of an ester-lactone.

U.S. Pat. No. 3,778,371 discloses a lubricating oil or fuel containing a quaternary ammonium salt of a hydrocarbon with a Mw of 350 to 3000; and the remaining groups to the quaternary nitrogen are selected from the group of C1 to C20 alkyl, C2 to C8 hydroxyalkyl, C2 to C20 alkenyl or cyclic groups.

The present invention, therefore, promotes optimal engine operation, that is, increased fuel economy, better vehicle drivability, reduced emissions and less engine maintenance by reducing, minimizing and controlling deposit formation.

SUMMARY OF THE INVENTION

The present invention further provides a method for fueling an internal combustion engine, comprising:
A. supplying to said engine:
 i. a fuel which is liquid at room temperature; and
 ii. quaternary ammonium salt comprising the reaction product of:
  (a) the reaction of a hydrocarbyl substituted acylating agent and a compound having an oxygen or nitrogen atom capable of condensing with said acylating agent and further having a tertiary amino group; and
  (b) a quaternizing agent suitable for converting the tertiary amino group to a quaternary nitrogen
 wherein the quaternizing agent is selected from the group consisting of dialkyl sulfates, benzyl halides, hydrocarbyl substituted carbonates; hydrocarbyl epoxides in combination with an acid or mixtures thereof.

The present invention additionally provides for composition comprising an quaternary ammonium salt which comprises the reaction product of:
a. the reaction of a hydrocarbyl-substituted acylating agent and a compound having an oxygen or nitrogen atom capable of condensing with said acylating agent and further having a tertiary amino group; and
b. a quaternizing agent suitable for converting the tertiary amino group to a quaternary nitrogen
 wherein the quaternizing agent is selected from the group consisting of dialkyl sulfates, benzyl halides, hydrocarbyl substituted carbonates; hydrocarbyl epoxides in combination with an acid or mixtures thereof.

DETAILED DESCRIPTION OF THE INVENTION

Various preferred features and embodiments will be described below by way of non-limiting illustration.

FIELD OF THE INVENTION

This invention involves a quaternary ammonium salt, a fuel composition that includes the quaternary ammonium salt, and a method of operating an internal combustion engine with the fuel composition. The compositions and methods of the present invention minimize, reduce and control deposit formation in the engine, which reduces fuel consumption, promotes drivability, vehicle maintenance, and reduces emissions which enables optimal engine operation.

Fuel

The composition of the present invention can comprise a fuel which is liquid at room temperature and is useful in fueling an engine. The fuel is normally a liquid at ambient conditions e.g., room temperature (20 to 30° C.). The fuel can be a hydrocarbon fuel, a nonhydrocarbon fuel, or a mixture thereof. The hydrocarbon fuel can be a petroleum distillate to include a gasoline as defined by ASTM specification D4814 or a diesel fuel as defined by ASTM specification D975. In an embodiment of the invention the fuel is a gasoline, and in other embodiments the fuel is a leaded gasoline, or a non-leaded gasoline. In another embodiment of this invention the fuel is a diesel fuel. The hydrocarbon fuel can be a hydrocarbon prepared by a gas to liquid process to include for example hydrocarbons prepared by a process such as the Fischer-Tropsch process. The nonhydrocarbon fuel can be an oxygen containing composition, often referred to as an oxygenate, to include an alcohol, an ether, a ketone, an ester of a carboxylic acid, a nitroalkane, or a mixture thereof. The nonhydrocarbon fuel can include for example methanol, ethanol, methyl t-butyl ether, methyl ethyl ketone, transesterified oils and/or fats from plants and animals such as rapeseed methyl ester and soybean methyl ester, and nitromethane. Mixtures of hydrocarbon and nonhydrocarbon fuels can include for example gasoline and methanol and/or ethanol, diesel fuel and ethanol, and diesel fuel and a transesterified plant oil such as rapeseed methyl ester. In an embodiment of the invention the liquid fuel is an emulsion of water in a hydrocarbon fuel, a nonhydrocarbon fuel, or a mixture thereof. In several embodiments of this invention the fuel can have a sulphur content on a weight basis that is 5000 ppm or less, 1000 ppm or less, 300 ppm or less, 200 ppm or less, 30 ppm or less, or 10 ppm or less. In another embodiment the fuel can have a sulphur content on a weight basis of 1 to 100 ppm. In one embodiment the fuel contains about 0 ppm to about 1000 ppm, about 0 to about 500 ppm, about 0 to about 100 ppm, about 0 to about 50 ppm, about 0 to about 25 ppm, about 0 to about 10 ppm, or about 0 to 5 ppm of alkali metals, alkaline earth metals, transition metals or mixtures thereof. In another embodiment the fuel contains 1 to 10 ppm by weight of alkali metals, alkaline earth metals, transition metals or mixtures thereof. It is well known in the art that a fuel containing alkali metals, alkaline earth metals, transition metals or mixtures thereof have a greater tendency to form deposits and therefore foul or plug common rail injectors. The fuel of the invention is present in a fuel composition in a major amount that is generally greater than 50 percent by weight, and in other embodiments is present at greater than 90 percent by weight, greater than 95 percent by weight, greater than 99.5 percent by weight, or greater than 99.8 percent by weight.

Quaternary Ammonium Salt

The composition of the present invention comprises an quaternary ammonium salt which comprises the reaction product of (a.) the reaction of a hydrocarbyl-substituted acylating agent and a compound having an oxygen or nitrogen atom capable of condensing with said acylating agent and further having a tertiary amino group; and (b) a quaternizing agent suitable for converting the tertiary amino group to a quaternary nitrogen wherein the quaternizing agent is selected from the group consisting of dialkyl sulfates, benzyl halides, hydrocarbyl substituted carbonates; hydrocarbyl epoxides in combination with an acid or mixtures thereof.

Examples of quaternary ammonium salt and methods for preparing the same are described in the following patents, which are hereby incorporated by reference, U.S. Pat. Nos. 4,253,980, 3,778,371, 4,171,959, 4,326,973, 4,338,206, and U.S. Pat. No. 5,254,138.

The Hydrocarbyl Substituted Acylating Agent

The hydrocarbyl substituted acylating agent of the present invention is the reaction product of a long chain hydrocarbon, generally a polyolefin substituted with a monounsaturated carboxylic acid reactant such as (i) α,β-monounsaturated $C_4$ to $C_{10}$ dicarboxylic acid such as fumaric acid, itaconic acid, maleic acid; (ii) derivatives of (i) such as anhydrides or $C_1$ to $C_5$ alcohol derived mono- or di-esters of (i); (iii) α,β-monounsaturated $C_3$ to $C_{10}$ monocarboxylic acid such as acrylic acid and methacrylic acid; or (iv) derivatives of (iii) such as $C_1$ to $C_5$ alcohol derived esters of (iii) with any compound containing an olefinic bond represented by the general formula:

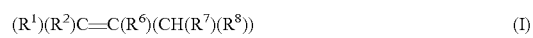

$$(R^1)(R^2)C = C(R^6)(CH(R^7)(R^8))  \quad (I)$$

wherein each of $R^1$ and $R^2$ is, independently, hydrogen or a hydrocarbon based group. Each of $R^6$, $R^7$ and $R^8$ is, independently, hydrogen or a hydrocarbon based group; preferably at least one is a hydrocarbon based group containing at least 20 carbon atoms.

Olefin polymers for reaction with the monounsaturated carboxylic acids can include polymers comprising a major molar amount of $C_2$ to $C_{20}$, e.g. $C_2$ to $C_5$ monoolefin. Such olefins include ethylene, propylene, butylene, isobutylene, pentene, octene-1, or styrene. The polymers can be homopolymers such as polyisobutylene, as well as copolymers of two or more of such olefins such as copolymers of; ethylene and propylene; butylene and isobutylene; propylene and isobutylene. Other copolymers include those in which a minor molar amount of the copolymer monomers e.g., 1 to 10 mole % is a $C_4$ to $C_{18}$ diolefin, e.g., a copolymer of isobutylene and butadiene; or a copolymer of ethylene, propylene and 1,4-hexadiene.

In one embodiment, at least one R of formula (I) is derived from polybutene, that is, polymers of C4 olefins, including 1-butene, 2-butene and isobutylene. C4 polymers can include polyisobutylene. In another embodiment, at least one R of formula (I) is derived from ethylene-alpha olefin polymers, including ethylene-propylene-diene polymers. Ethylene-alpha olefin copolymers and ethylene-lower olefin-diene terpolymers are described in numerous patent documents, including European patent publication EP 0 279 863 and the following U.S. Pat. Nos. 3,598,738; 4,026,809; 4,032,700; 4,137,185; 4,156,061; 4,320,019; 4,357,250; 4,658,078; 4,668,834; 4,937,299; 5,324,800 each of which are incorporated herein by reference for relevant disclosures of these ethylene based polymers.

In another embodiment, the olefinic bonds of formula (I) are predominantly vinylidene groups, represented by the following formulas:

wherein R is a hydrocarbyl group

wherein R is a hydrocarbyl group.

In one embodiment, the vinylidene content of formula (I) can comprise at least about 30 mole % vinylidene groups, at least about 50 mole % vinylidene groups, or at least about 70 mole % vinylidene groups. Such material and methods for preparing them are described in U.S. Pat. Nos. 5,071,919; 5,137,978; 5,137,980; 5,286,823, 5,408,018, 6,562,913, 6,683,138, 7,037,999 and U.S. Publication Nos. 20040176552A1, 20050137363 and 20060079652A1, which are expressly incorporated herein by reference, such products are commercially available by BASF, under the tradename GLISSOPAL® and by Texas PetroChemical LP, under the tradename TPC 1105™ and TPC 595™.

Methods of making hydrocarbyl substituted acylating agents from the reaction of the monounsaturated carboxylic acid reactant and the compound of formula (I) are well know in the art and disclosed in the following U.S. Pat. Nos. 3,361, 673 and 3,401,118 to cause a thermal "ene" reaction to take place; U.S. Pat. Nos. 3,087,436; 3,172,892; 3,272,746, 3,215, 707; 3,231,587; 3,912,764; 4,110,349; 4,234,435; 6,077,909; 6,165,235 and are hereby incorporated by reference.

In another embodiment, the hydrocarbyl substituted acylating agent can be made from the reaction of at least one carboxylic reactant represented by the following formulas:

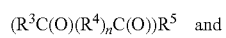    (IV)

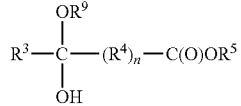    (V)

wherein each of $R^3$, $R^5$ and $R^9$ is independently H or a hydrocarbyl group, $R^4$ is a divalent hydrocarbylene group and n is 0 or 1 with any compound containing an olefin bond as represented by formula (I). Compounds and the processes for making these compounds are disclosed in U.S. Pat. Nos. 5,739,356; 5,777,142; 5,786,490; 5,856,524; 6,020,500; and 6,114,547.

In yet another embodiment, the hydrocarbyl substituted acylating agent can be made from the reaction of any compound represented by formula (I) with (IV) or (V), and can be carried out in the presence of at least one aldehyde or ketone. Suitable aldehydes include formaldehyde, acetaldehyde, propionaldehyde, butyraldehyde, isobutyraldehyde, pentanal, hexanal. heptaldehyde, octanal, benzaldehyde, and higher aldehydes. Other aldehydes, such as dialdehydes, especially glyoxal, are useful, although monoaldehydes are generally preferred. In one embodiment, aldehyde is formaldehyde, which can be supplied as the aqueous solution often referred to as formalin, but is more often used in the polymeric form as paraformaldehyde, which is a reactive equivalent of, or a source of, formaldehyde. Other reactive equivalents include hydrates or cyclic trimers. Suitable ketones include acetone, butanone, methyl ethyl ketone, and other ketones. Preferably, one of the two hydrocarbyl groups is methyl. Mixtures of two or more aldehydes and/or ketones are also useful.

Compounds and the processes for making these compounds are disclosed in U.S. Pat. Nos. 5,840,920; 6,147,036; and 6,207,839.

In another embodiment, the hydrocarbyl substituted acylating agent can include, methylene bis-phenol alkanoic acid compounds, the condensation product of (i) aromatic compound of the formula:

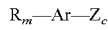    (VI)

wherein R is independently a hydrocarbyl group, Ar is an aromatic group containing from 5 to about 30 carbon atoms and from 0 to 3 optional substituents such as amino, hydroxy- or alkyl-polyoxyalkyl, nitro, aminoalkyl, carboxy or combinations of two or more of said optional substituents, Z is independently OH, lower alkoxy, $(OR^{10})_bOR^{11}$, or O— wherein each $R^{10}$ is independently a divalent hydrocarbyl group, $R^{11}$ is H or hydrocarbyl and b is a number ranging from 1 to about 30. c is a number ranging from 1 to about 3 and m is 0 or an integer from 1 up to about 6 with the proviso that m does not exceed the number of valences of the corresponding Ar available for substitution and (ii) at least on carboxylic reactant such as the compounds of formula (IV) and (V) described above. In one embodiment, at least one hydrocarbyl group on the aromatic moiety is derived from polybutene. In one embodiment, the source of hydrocarbyl groups are above described polybutenes obtained by polymerization of isobutylene in the presence of a Lewis acid catalyst such as aluminum trichloride or boron trifluoride.

Compounds and the processes for making these compounds are disclosed in U.S. Pat. Nos. 3,954,808; 5,336,278; 5,458,793; 5,620,949; 5,827,805; and 6,001,781.

In another embodiment, the reaction of (i) with (ii), optionally in the presence of an acidic catalyst such as organic sulfonic acids, heteropolyacids, and mineral acids, can be carried out in the presence of at least one aldehyde or ketone. The aldehyde or ketone reactant employed in this embodiment is the same as those described above. The ratio of the hydroxyaromatic compound: carboxylic reactant:aldehyde or ketone can be 2:(0.1 to 1.5):(1.9 to 0.5). In one embodiment, the ratio is 2:(0.8 to 1.1):(1.2 to 0.9). The amounts of the materials fed to the reaction mixture will normally approximate these ratios, although corrections may need to be made to compensate for greater or lesser reactivity of one component or antoher, in order to arrive at a reaction product with the desired ratio of monomers. Such corrections will be apparent to the person skilled in the art. While the three reactants can be condensed simultaneously to form the product, it is also possible to conduct the reaction sequentially, whereby the hydroxyaromatic is reacted first with either the carboxylic reactant and thereafter with the aldehyde or ketone, or vice versa. Compounds and the processes for making these compounds are disclosed in U.S. Pat. No. 5,620,949.

Other methods of making the hydrocarbyl substituted acylating agent can be found in the following reference, U.S. Pat. Nos. 5,912,213; 5,851,966; and 5,885,944 which are hereby incorporated by reference.

Compound Having a Nitrogen or Oxygen Atom

The composition of the present invention contains a compound having an oxygen or nitrogen atom capable of condensing with the acylating agent and further having a tertiary amino group.

In one embodiment, the compound having an oxygen or nitrogen atom capable of condensing with the acylating agent and further having a tertiary amino group can be represented by the following formulas:

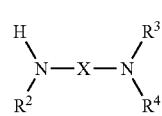    (VII)

wherein X is a alkylene group containing about 1 to about 4 carbon atoms; $R^2$, $R^3$ and $R^4$ are hydrocarbyl groups.

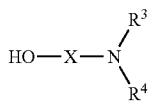

(VIII)

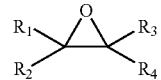

(IX)

wherein X is a alkylene group containing about 1 to about 4 carbon atoms; R3 and R4 are hydrocarbyl groups.

Examples of the nitrogen or oxygen contain compounds capable of condensing with the acylating agent and further having a tertiary amino group can include but are not limited to: dimethylaminopropylamine, N,N-dimethyl-aminopropylamine, N,N-diethyl-aminopropylamine, N,N-dimethyl-aminoethylamine ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenep entaamine, pentaethylenehexaamine, hexamethylenetetramine, and bis (hexamethylene) triamine, the diaminobenzenes, the diaminopyridines or mixtures thereof. The nitrogen or oxygen containing compounds capable of condensing with the acylating agent and further having a tertiary amino group can further include aminoalkyl substituted heterocyclic compounds such as 1-(3-aminopropyl)imidazole and 4-(3-aminopropyl)morpholine, 1-(2-amino ethyl)piperidine, 3,3-diamino-N-methyldipropylamine, 3',3-aminobis(N,N-dimethylpropyl amine). Another type of nitrogen or oxygen containing compounds capable of condensing with the acylating agent and having a tertiary amino group include alkanolamines including but not limited to triethanolamine, trimethanolamine, N,N-dimethylaminopropanol, N,N-diethylaminopropanol, N,N-diethylaminobutanol, N,N,N-tris (hydroxyethyl)amine, N,N,N-tris(hydroxymethyl)amine.

Quaternizing Agent

The composition of the present invention contains a quaternizing agent suitable for converting the tertiary amino group to a quaternary nitrogen wherein the quaternizing agent is selected from the group consisting of dialkyl sulfates, benzyl halides, hydrocarbyl substituted carbonates; hydrocarbyl epoxides in combination with an acid or mixtures thereof.

In one embodiment the quaternizing agent can include halides, such as chloride, iodide or bromide; hydroxides; sulphonates; alkyl sulphates, such as dimethyl sulphate; sultones; phosphates; C1-12 alkylphosphates; di C1-12 alkylphosphates; borates; C1-12 alkylborates; nitrites; nitrates; carbonates; bicarbonates; alkanoates; O,O-di C1-12 alkyldithiophosphates; or mixtures thereof.

In one embodiment the quaternizing agent may be derived from dialkyl sulphates such as dimethyl sulphate, N-oxides, sultones such as propane and butane sultone; alkyl, acyl or araalkyl halides such as methyl and ethyl chloride, bromide or iodide or benzyl chloride, and a hydrocarbyl (or alkyl) substituted carbonates. If the acyl halide is benzyl chloride, the aromatic ring is optionally further substituted with alkyl or alkenyl groups.

The hydrocarbyl (or alkyl) groups of the hydrocarbyl substituted carbonates may contain 1 to 50, 1 to 20, 1 to 10 or 1 to 5 carbon atoms per group. In one embodiment the hydrocarbyl substituted carbonates contain two hydrocarbyl groups that may be the same or different. Examples of suitable hydrocarbyl substituted carbonates include dimethyl or diethyl carbonate.

In another embodiment the quaternizing agent can be a hydrocarbyl epoxides, as represented by the following formula, in combination with an acid:

wherein R1, R2, R3 and R4 can be independently H or a C1-50 hydrocarbyl group.

Examples of hydrocarbyl epoxides can include, styrene oxide, ethylene oxide, propylene oxide, butylene oxide, stilbene oxide and C2-50 epoxide.

Oil of Lubricating Viscosity

The composition of the present invention can contain an oil of lubricating viscosity. The oil of lubricating viscosity includes natural or synthetic oils of lubricating viscosity, oil derived from hydrocracking, hydrogenation, hydrofinishing, unrefined, refined and re-refined oils, or mixtures thereof. In one embodiment the oil of lubricating viscosity is a carrier fluid for the dispersant and/or other performance additives.

Natural oils include animal oils, vegetable oils, mineral oils or mixtures thereof. Synthetic oils include a hydrocarbon oil, a silicon-based oil, a liquid ester of phosphorus-containing acid. Synthetic oils may be produced by Fischer-Tropsch reactions and typically may be hydroisomerised Fischer-Tropsch hydrocarbons or waxes.

Oils of lubricating viscosity may also be defined as specified in the American Petroleum Institute (API) Base Oil Interchangeability Guidelines. In one embodiment the oil of lubricating viscosity comprises an API Group I, II, III, IV, V or mixtures thereof, and in another embodiment API Group I, II, III or mixtures thereof.

Miscellaneous

The composition optionally comprises one or more additional performance additives. The other performance additives include metal deactivators, detergents, dispersants, viscosity modifiers, friction modifiers, dispersant viscosity modifiers, extreme pressure agents, antiwear agents, antioxidants, corrosion inhibitors, foam inhibitors, demulsifiers, pour point depressants, seal swelling agents, wax control polymers, scale inhibitors, gas-hydrate inhibitors and mixtures thereof.

The total combined amount of the additional performance additive compounds present on an oil free basis ranges from 0 wt % to 25 wt % or 0.01 wt % to 20 wt % of the composition. Although one or more of the other performance additives may be present, it is common for the other performance additives to be present in different amounts relative to each other.

In one embodiment the composition can be in a concentrate forming amount. If the present invention may be in the form of a concentrate (which may be combined with additional oil to form, in whole or in part, a finished lubricant and/or liquid fuel), the ratio of the additive of the invention and/or other additional performance additives in an oil of lubricating viscosity and/or liquid fuel, to diluent oil is in the range of 80:20 to 10:90 by weight.

Antioxidants include molybdenum dithiocarbamates, sulphurised olefins, hindered phenols, diphenylamines; detergents include neutral or overbased, Newtonian or non-Newtonian, basic salts of alkali, alkaline earth and transition metals with one or more of phenates, sulphurised phenates, sulphonates, carboxylic acids, phosphorus acids, mono- and/or di-thiophosphoric acids, saligenins, an alkylsalicylates, salixarates. Dispersants include N-substituted long chain alkenyl succinimide as well as posted treated version thereof, post-treated dispersants include those by reaction with urea, thiourea, dimercaptothiadiazoles, carbon disulphide, aldehydes, ketones, carboxylic acids, hydrocarbon-substituted succinic anhydrides, nitriles, epoxides, boron compounds, and phosphorus compounds.

Antiwear agents include compounds such as metal thiophosphates, especially zinc dialkyldithiophosphates; phosphoric acid esters or salt thereof; phosphites; and phosphorus-containing carboxylic esters, ethers, and amides. Antiscuffing agents including organic sulphides and polysulphides, such as benzyldisulphide, bis-(chlorobenzyl) disulphide, dibutyl tetrasulphide, di-tertiary butyl polysulphide, di-tert-butylsulphide, sulphurised Diels-Alder adducts or alkyl sulphenyl N'N-dialkyl dithiocarbamates. Extreme Pressure (EP) agents including chlorinated wax, organic sulphides and polysulphides, such as benzyldisulphide, bis-(chlorobenzyl) disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons, metal thiocarbamates, such as zinc dioctyldithiocarbamate and barium heptylphenol diacid.

Friction modifiers include fatty amines, esters such as borated glycerol esters, partial esters of glycerol such as glycerol monooleate, fatty phosphites, fatty acid amides, fatty epoxides, borated fatty epoxides, alkoxylated fatty amines, borated alkoxylated fatty amines, metal salts of fatty acids, fatty imidazolines, condensation products of carboxylic acids and polyalkylene-polyamines, amine salts of alkylphosphoric acids. Viscosity modifiers include hydrogenated copolymers of styrene-butadiene, ethylene-propylene polymers, polyisobutenes, hydrogenated styrene-isoprene polymers, hydrogenated isoprene polymers, polymethacrylate acid esters, polyacrylate acid esters, polyalkyl styrenes, alkenyl aryl conjugated diene copolymers, polyolefins, polyalkylmethacrylates and esters of maleic anhydride-styrene copolymers. Dispersant viscosity modifiers (often referred to as DVM) include functionalised polyolefins, for example, ethylene-propylene copolymers that have been functionalized with the reaction product of maleic anhydride and an amine, a polymethacrylate functionalised with an amine, or styrene-maleic anhydride copolymers reacted with an amine.

Corrosion inhibitors include octylamine octanoate, condensation products of dodecenyl succinic acid or anhydride and a fatty acid such as oleic acid with a polyamine. Metal deactivators include derivatives of benzotriazoles, 1,2,4-triazoles, benzimidazoles, 2-alkyldithiobenzimidazoles or 2-alkyldithiobenzothiazoles. Foam inhibitors include copolymers of ethyl acrylate and 2-ethylhexylacrylate and optionally vinyl acetate. Demulsifiers include polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides. Seal swell agents include Exxon Necton-37™ (FN 1380) and Exxon Mineral Seal Oil

INDUSTRIAL APPLICATION

In one embodiment the invention is useful as a liquid fuel for an internal combustion engine. The internal combustion engine includes spark ignition and compression ignition engines; 2-stroke or 4-stroke cycles; liquid fuel supplied via direct injection, indirect injection, port injection and carburetor; common rail and unit injector systems; light (e.g. passenger car) and heavy duty (e.g. commercial truck) engines; and engines fuelled with hydrocarbon and non-hydrocarbon fuels and mixtures thereof. The engines may be part of integrated emissions systems incorporating such elements as; EGR systems; aftertreatment including three-way catalyst, oxidation catalyst, NOx absorbers and catalysts, catalyzed and non-catalyzed particulate traps optionally employing fuel-borne catalyst; variable valve timing; and injection timing and rate shaping.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples, which sets forth particularly advantageous embodiments. While the examples are provided to illustrate the present invention, they are not intended to limit it.

The detergents are evaluated in the engine nozzle fouling test, as described in CEC F-23-01. The results of the engine nozzle fouling test are highlighted in Tables 1 and 2.

The detergents that are used in this test include: a commercial available 1000 Mn polyisobutylene succinimide of dimethylaminopropylamine (Comparative Example 1), a commercially available 1000 Mn polyisobutylene succinimide of tetraethylenepentamine (Comparative Example 2) and 4 experimental detergents of the present invention (Examples 1-4) as described below.

Preparatory Example A

Preparatory Example A is prepared from a mixture of succinic anhydride prepared from 1000 Mn polyisobutylene (21425 grams) and diluent oil—pilot 900 (3781 grams) which are heated with stirring to 110° C. under a nitrogen atmosphere. Dimethylaminopropylamine (DMAPA, 2314 grams) is added slowly over 45 minutes maintaining batch temperature below 115° C. The reaction temperature is increased to 150° C. and held for a further 3 hours. The resulting compound is a DMAPA succinimide.

Example 1

Reaction product of Preparatory Example A, styrene oxide (12.5 grams), acetic acid (6.25 grams) and methanol (43.4 grams) are heated with stirring to reflux (~80° C.) for 5 hours under a nitrogen atmosphere. The reaction is purified by distillation (30° C., −1 bar) and gave a water white distillate. The resulting compound is a styrene oxide quaternary ammonium salt.

Example 2

Reaction product of Preparatory Example A (373.4 grams) is heated with stirring to 90° C. Dimethylsulphate (25.35 g) is charged to the reaction pot and stirring resumed (~300 rpm) under a nitrogen blanket, exotherm raises batch temperature to ~100° C. The reaction is maintained at 100° C. for 3 hours before cooling back and decanting. The resulting compound is a dimethylsulphate quaternary ammonium salt.

Example 3

Reaction product of Preparatory Example A (1735.2 grams) is heated with stirring to 90° C. under a nitrogen atmosphere. Benzyl chloride (115.4 grams) is added drop wise maintaining reaction temperature at 90° C. The reaction is held for 5 hours at 90° C. The resulting compound is a benzyl chloride quaternary ammonium salt.

Example 4

The reaction product of Preparatory Example A (152.6 grams), dimethyl carbonate (31 grams) and methanol (26.9 grams) is charged to a pressure vessel. The vessel is then pressure tested for leaks and purged with nitrogen twice. The vessel is pressurized to ~19 psi and the batch heated to 90° C. with agitation (~210 rpm). The batch is held on temperature for one hour before being heated to 140° C. and held on temperature for 24 hours. On cooling back to ambient temperature residual pressure is released before decanting product. The reaction was purified by distillation (100° C., −0.5 bar) to remove free dimethyl carbonate and methanol. The resulting compound is a dimethyl carbonate quaternary ammonium salt.

Note: For Comparative Examples 1 and 2 the active chemical is accompanied by inert diluent oil in a ratio of active chemical to diluent oil of 85:15 by weight.

Note: For Examples 1-4 the active chemical is accompanied by inert diluent oil in a ratio of active chemical to diluent oil of 50:50 by weight.

TABLE 1

Results in the CEC F-23-01 Injector Deposit Test

| Detergent | Dose Rate Active (ppm) | Percent Remaining Flow (%) |
| --- | --- | --- |
| None* | 0.0 | 11.0 |
| Example 1 | 17.5 | 73.2 |
| Example 1 | 17.5 | 46.4 |
| Example 2 | 17.5 | 31.0 |

TABLE 1-continued

Results in the CEC F-23-01 Injector Deposit Test

| Detergent | Dose Rate Active (ppm) | Percent Remaining Flow (%) |
| --- | --- | --- |
| Example 2 | 17.5 | 24 |
| Example 3 | 17.5 | 33.7 |
| Example 4 | 15 | 27.1 |

Note:
*unadditized base fuel (no detergent present in the fuel)

TABLE 2

Results in the CEC F-23-01 Injector Deposit Test

| Detergent | Dose Rate Active (ppm) | Percent Remaining Flow (%) |
| --- | --- | --- |
| Comparative Ex. 2 | 51 | 79 |
| Comparative Ex. 2 | 51 | 63 |
| Example 2 | 50 | 100 |
| Example 2 | 50 | 98 |
| Comparative Ex. 2 | 38.25 | 34 |
| Comparative Ex. 2 | 38.25 | 32.4 |
| Comparative Ex. 2 | 38.25 | 30 |
| Example 2 | 38.5 | 76 |
| Example 4 | 38.5 | 41 |
| Example 4 | 38.5 | 72 |
| Example 4 | 38.5 | 84 |
| Comparative Ex. 1 | 38.25 | 84.0 |
| Example 1 | 35.0 | 99.6 |
| Example 1 | 35.0 | 84.8 |

The results of the test show that formulations using quaternary ammonium salt detergents of the present invention (Examples 1, 2, 3, and 4) shows equivalent or superior flow performance and less average blockage of an injector compared to formulations using an unadditized fuel and/or commercially available detergents (Comparative Examples 1 and 2).

The detergents are further evaluated in a High Speed Direct Injection Test. The High Speed Direct Injection Test is described as follows. A diesel fuel containing 1 ppm of zinc plus the respective detergent is inserted into a 2.0 L High Speed Direct Injection (HSDI) Ford Puma engine. The engine is initially run at 2000 rev/minute for 5 minutes (engine warm-up period). After the initial warm up period, the engine is run in six (6) power curve iterations under the conditions set forth in Table 3. After completion of the sixth power curve iteration, the engine is subjected to the stabilization period under the conditions set forth in Table 4. After the stabilization period is complete, the engine is run in another six (6) power curve iterations under the conditions set forth in Table 3. The power output of the engine is measured during the 9th stage of the power curve iteration. The power at this 9th stage during the final power curve iteration (12th power curve iteration) is compared to the power at the 9th stage of the first power curve iteration and a final power loss in percent is calculated. The less power loss present in the engine the more effective the detergent is at reducing or minimizing power loss. The results of the test are summarized in Table 5.

The detergents that are used in this test include: a commercial available 1000 Mn polyisobutylene succinimide of dimethylaminopropylamine (Comparative Example 1), a commercially available 1000 Mn polyisobutylene succinimide of tetraethylenepentamine (Comparative Example 2) and 3 experimental detergents of the present invention (Examples 1, 2 and 4) as described above.

TABLE 3

Power Curve Iteration

| Stage | Time (min) | Speed (rev/min) |
|---|---|---|
| 1 | 5 | 1000 ± 10 |
| 2 | 5 | 1250 ± 10 |
| 3 | 5 | 1500 ± 10 |
| 4 | 5 | 1750 ± 10 |
| 5 | 5 | 2000 + 10 |
| 6 | 5 | 2250 ± 10 |
| 7 | 5 | 2500 ± 10 |
| 8 | 5 | 3000 ± 10 |
| 9 | 5 | 3300 ± 10 |
| 10 | 5 | 3500 ± 10 |
| 11 | 5 | 4000 ± 10 |

NOTE:
The ramping time between stages is 27 seconds except for the ramp from Stage 11 back to Stage 1 which is 30 seconds. These ramp times are not included in the stage times (i.e. total duration of the schedule is (11*5 minute stages) + (10*27 second ramps) + (1*30 second ramp) giving a total cycle time of 60 minutes).

TABLE 4

Stabilization Run

| Stage | Time (hrs) | Speed (rev/min) | Load (N-m) |
|---|---|---|---|
| 1 | 2 | 3000 ± 10 | 150 |
| 2 | 2 | 2020 ± 10 | 95 |
| 3 | 1 | 3500 ± 10 | 80 |

TABLE 5

Results in a High Speed Direct Injection Test

| Detergent | Dose Rate Active (ppm) | % Power Loss at 17 hrs |
|---|---|---|
| None | 0.0 | 9.13 |
| None | 0.0 | 9.71 |
| Example 1 | 17.5 | 1.85 |
| Example 2 | 17.5 | 3.15 |
| Example 4 | 15 | 9.95 |
| Comparative Ex 1 | 38.25 | 8.35 |
| Comparative Ex 1 | 38.25 | 6.48 |
| Comparative Ex 2 | 38.25 | 5.30 |

Note:
* unadditized diesel base fuel (no detergent present in the fuel)

The results of the test show that formulations using quaternary ammonium salt detergents of the present invention (Examples 1, 2, and 4) produce equivalent or reduced power loss compared to formulations using a unadditized fuel and/or commercial available detergents (Comparative Examples 1 and 2).

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A method of improving the power loss performance of an internal combustion engine comprising:
   A. supplying to said engine a fuel composition comprising:
      i. a fuel which is liquid at room temperature; and
      ii. quaternary ammonium salt comprising the reaction product of:
         (a) the reaction of a hydrocarbyl substituted acylating agent and a compound having an oxygen or nitrogen atom capable of condensing with said acylating agent and further having a tertiary amino group; and
         (b) a quaternizing agent suitable for converting the tertiary amino group to a quaternary nitrogen
      wherein the quaternizing agent is selected from the group consisting of: (i) hydrocarbyl substituted carbonates; (ii) hydrocarbyl epoxides in combination with an acid; or (iii) mixtures thereof.

2. The method of claim 1 wherein the fuel is gasoline, diesel fuel, an oxygen containing composition, or combinations thereof.

3. The method of claim 1 wherein the fuel has:
   (i) a sulfur content on a weight basis of 5000 ppm or less;
   (ii) an alkali metal content of 0 to 1000 ppm; or (iii) combinations thereof.

4. The method of claim 1, wherein the hydrocarbyl-substituted acylating agent is polyisobutylene succinic anhydride.

5. The method of claim 1, wherein the compound of (a) is a N-methyl-1,3-diaminopropane.

* * * * *